United States Patent [19]

Taylor et al.

[11] Patent Number: 4,706,737
[45] Date of Patent: Nov. 17, 1987

[54] FUEL CELL COOLANT INLET MANIFOLD AND SYSTEM

[75] Inventors: William A. Taylor; Martin L. Abrams, both of Glastonbury, Conn.

[73] Assignee: International Fuel Cells Corporation, South Windsor, Conn.

[21] Appl. No.: 932,849

[22] Filed: Nov. 20, 1986

[51] Int. Cl.[4] ............ F28F 19/00; H01M 8/24; H01M 8/04; H01M 8/12
[52] U.S. Cl. .................... 165/47; 165/119; 429/26; 429/34; 429/120
[58] Field of Search ............ 165/47, 119; 429/26, 429/34, 120

[56] References Cited

U.S. PATENT DOCUMENTS

| | | | |
|---|---|---|---|
| 3,168,138 | 2/1965 | Stoker et al. | 165/119 |
| 3,969,145 | 7/1976 | Grevstad et al. | 429/26 |
| 4,310,605 | 1/1982 | Early et al. | 429/26 |
| 4,567,119 | 1/1986 | Lim | 429/120 |
| 4,574,112 | 3/1986 | Breault et al. | 429/120 |
| 4,623,596 | 11/1986 | Kamoshita | 429/34 |
| 4,640,873 | 2/1987 | Tajima et al. | 429/26 |

Primary Examiner—William R. Cline
Assistant Examiner—John K Ford
Attorney, Agent, or Firm—William W. Jones

[57] ABSTRACT

Coolant water is delivered to a fuel cell stack through a manifold which extends up the side of the stack and which communicates with the cooling plates in the stack by means of a plurality of outlet pipes or snivvies. The coolant exhausted from the stack is handled with a similar outlet manifold with corresponding outlet snivvies. The water is ducted into the inlet manifold via a conduit which opens into the inlet manifold at the top thereof and a bleed conduit extends from the inlet manifold at the bottom thereof, to an ion exchange bed polisher and then back to the cooling system bypassing the stack. In this manner, constriction of the snivvies by iron oxide and copper corrosion product is more uniformly distributed on the inlet side, and the corrosion products in the coolant water which settle to the bottom of the inlet manifold are carried around the stack to the polisher or ion exchange bed where particles are removed from the water, whereupon the water is returned to the coolant loop.

2 Claims, 5 Drawing Figures

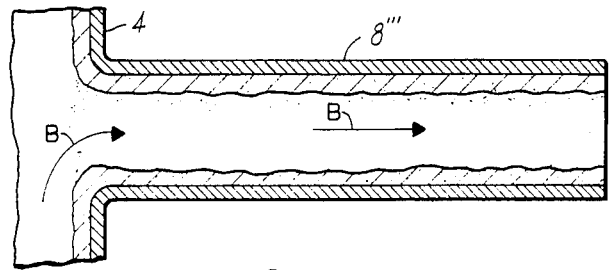
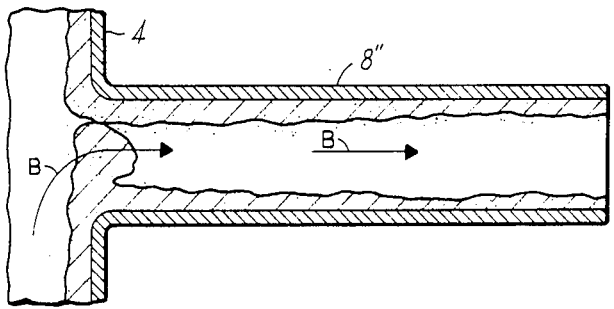
FIG. 3
PRIOR ART
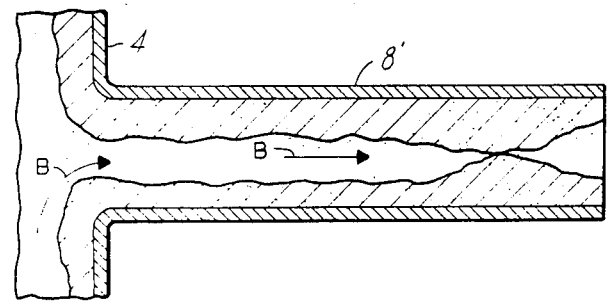

FUEL CELL COOLANT INLET MANIFOLD AND SYSTEM

DESCRIPTION

1. Technical Field

This invention relates to electrochemical cells such as fuel cells, and stacks of such cells operable to generate significant amounts of electricity. More particularly, this invention relates to cooling systems for fuel cell stacks, which cooling systems employ water as the coolant.

2. Background Art

Fuel cells are arranged in stacks for the production of commercially significant amounts of electricity. The cells are formed from plate-like constituents which are stacked one atop the other and electrically connected in series so as to produce significant voltages. In fuel cells of the type which require cooling, there will be a plurality of cooling plates interspersed throughout the stack so that the operating temperature of the entire stack will remain in a predetermined range. The specific coolant used can be gaseous or can be a liquid, such as water. The coolant system in a power plant using one or more fuel cell stacks is generally a closed system with the coolant being circulated through the stack or stacks in heat exchange relationship with the cells to pick up heat from the latter by boiling part of the coolant. The resultant steam and water are then circulated through a steam separator which removes the heat and steam from the coolant. The steam is then used for fuel processing. The liquid coolant is then recirculated back to the cell stacks. When the coolant is water, the conditions to which it is subjected cause corrosion of the various cooling system components. The corrosion product particles become entrained in the water coolant, which can clog narrow passages in the closed coolant system. Iron oxides and copper precipitates, in particular, have been noted in the conduits of such water cooled essentially closed circuit coolant systems. Maintenance thus requires periodic chemical or physical cleaning of these deposits before one or more of the coolant passages become completely clogged.

The coolant system of this invention operates with a water coolant and is designed to provide maximum stack usage between coolant system cleanings so as to increase the operating time of the power plant. It has been observed that the coolant inlet manifold ports or snivvies is a primary location for accumulation of corrosion product deposits and other suspended material in the coolant system, and that such suspended particles can deposit at the bottom of the inlet manifold and preferentially in the bottom snivvies. The constant influx and outflow of water through this inlet manifold will tend to recirculate material as it settles toward the bottom of the manifold. Continuation of such resuspension of settling particles will result in the lower portion of the manifold wall on the snivvy side thereof experiencing heavy, thicker than normal coatings of the corrosion deposits. Thus, the side of the manifold where water flows into the snivvies to the coolant plates in the stack and the snivvy walls can become heavily coated with material deposited from or carried by the water to the extent that the snivvies can plug. This problem of nonuniform distribution of deposits among all snivvies and the entire manifold length occurs when the water inlet to the inlet manifold is positioned at the bottom of the manifold. In such a case, the inflowing water is constantly stirring up and redistributing and agglomerating material that wants to settle in the bottom of the manifold, to the lower snivvies.

The coolant system of this invention is designed to substantially eliminate the preferential deposition by evenly distributing the depositing material in the inlet manifold and snivvies so that the stacks will be adequately cooled through longer operational periods of the power plant. With the system of this invention the snivvies will remain unclogged for longer periods of time so that maintenance cleaning of the power plant can be performed after longer operational intervals. Thus, overall uptime of the power plant is improved.

In the coolant system of this invention, the water coolant is introduced into the coolant inlet manifold at the top thereof above all of the snivvies through a large radius elbow which decreases turbulence. The water thus flows through the inlet manifold in a downward direction and then out of the manifold via the snivvies. There is a bleed passage at the bottom of the inlet manifold which lies below the lowermost coolant plate snivvy and which provides a flow passage directly to a water ion exchange bed polisher bypassing the stack. The bleed passage provides a detour around the stack whereby particles which would otherwise settle in the bottom of the inlet manifold and perhaps agglomerate there or flow into the lower stack snivvies, will be continuously transferred around the stack and over to the polisher where they will be removed from the water, and the water then returned to the cooling system. Once in the polisher, the dissolved solids in the water are removed by ion exchange, and iron-based particles are removed by adhering to the anion resin fraction in the polisher. The treated water is then returned to the cooling loop. In this manner, the larger, heavier suspended particles will tend to move toward the bottom of the inlet manifold where they will be transferred to the polisher, bypassing the stack. Areas of excessive deposit, accumulation, and agglomeration of material in the coolant water are thus avoided, and the larger and heavier particles do not tend to pass into the coolant inlet ports in the stack. In the system of this invention there will still occur particle deposition within coolant conduits, but the deposition which does occur is relatively evenly distributed and there is a minimizing of local excessive buildup. The result is that the power plant can be operated for longer uninterrupted periods of time between cleanings of the coolant system. Another result of more uniform deposition in all snivvies is that liquid chemical cleaning, which must depend on relatively uniform flow rates simultaneously through all snivvies, can be accomplished more quickly. During such chemical cleaning of the prior art inlet manifold, most of the flow is through the relatively unrestricted top snivvies. Slight deposits in these snivvies are quickly removed. However, the slow or no flow conditions in the more restricted or blocked bottom snivvies removes the thicker deposits much more slowly.

It is therefore an object of this invention to provide an improved cooling system for a fuel cell stack which permits the stack to be operated for longer periods of time between coolant system conduit cleanings.

It is a further object of this invention to provide a fuel cell stack cooling system of the character described wherein the lowermost coolant snivvies of the coolant manifolds are protected against premature blockage by particulate matter from the coolant by more evenly distributing the particulate matter throughout the manifold and snivvies.

It is an additional object of this invention to provide a cooling system of the character described wherein localized excessive concentrations of suspended particulate matter and excessive conduit deposits are minimized.

These and other objects and advantages of the invention will become more readily apparent from the following detailed disclosure of a preferred embodiment of the invention when taken in conjunction with the accompanying drawings.

BRIEF DESCRIPTION OF DRAWINGS

FIG. 3 is a fragmented side sectional view of specific ones of the coolant inlet snivvies;

BEST MODE FOR CARRYING OUT THE INVENTION

Figure 1:
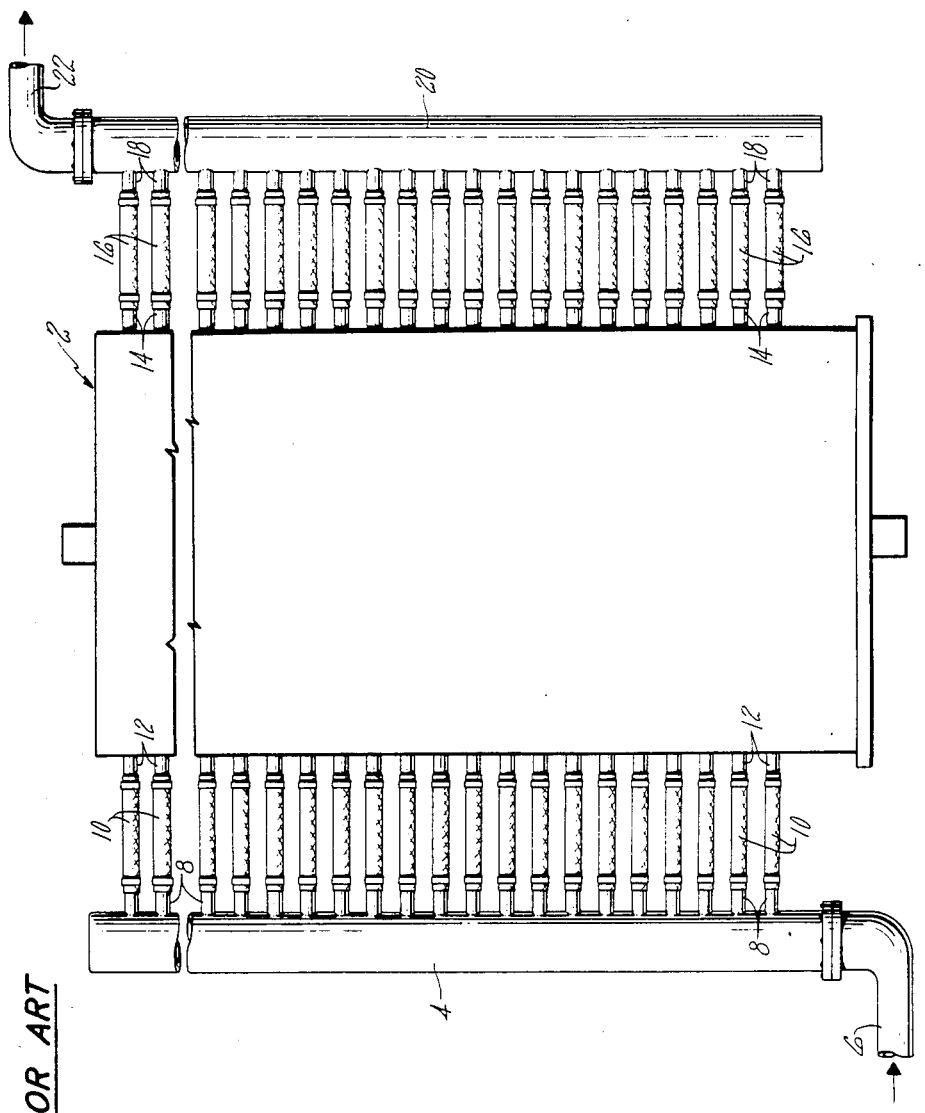
FIG. 1 is a somewhat schematic elevational view of a stack cooling system which uses water as the coolant and which is constructed in accordance with the prior art.

Referring now to the drawings, there is shown in FIG. 1 a fuel cell stack assembly which is cooled in accordance with the prior art. The fuel cell stack, denoted generally by the numeral 2, is cooled with water which is fed into and through a plurality of interspersed coolant plates from an inlet manifold 4. The water is pumped into the inlet manifold 4 through an inlet conduit 6 which opens into the bottom of the inlet manifold 4. A plurality of feed conduits, or snivvies 8, open from the inlet manifold 4 and extend toward the stack 2. Dielectric hoses 10 are clamped to each snivvy 8 on one end and on the other end to feeders 12 for each of the cooling tube arrays within the cooling plates. After the coolant water passes through the cooling plates, the water and steam flow into outlet pipes 14 to which are clamped dielectric hoses 16. The hoses 16 are also clamped to outlet snivvies 18 which feed the water and steam to an outlet manifold 20. The outlet manifold 20 is connected to an outlet conduit 22 from whence the water and the steam flow through a steam separator (not shown) prior to the water being returned to the inlet conduit 6.

Figure 2:
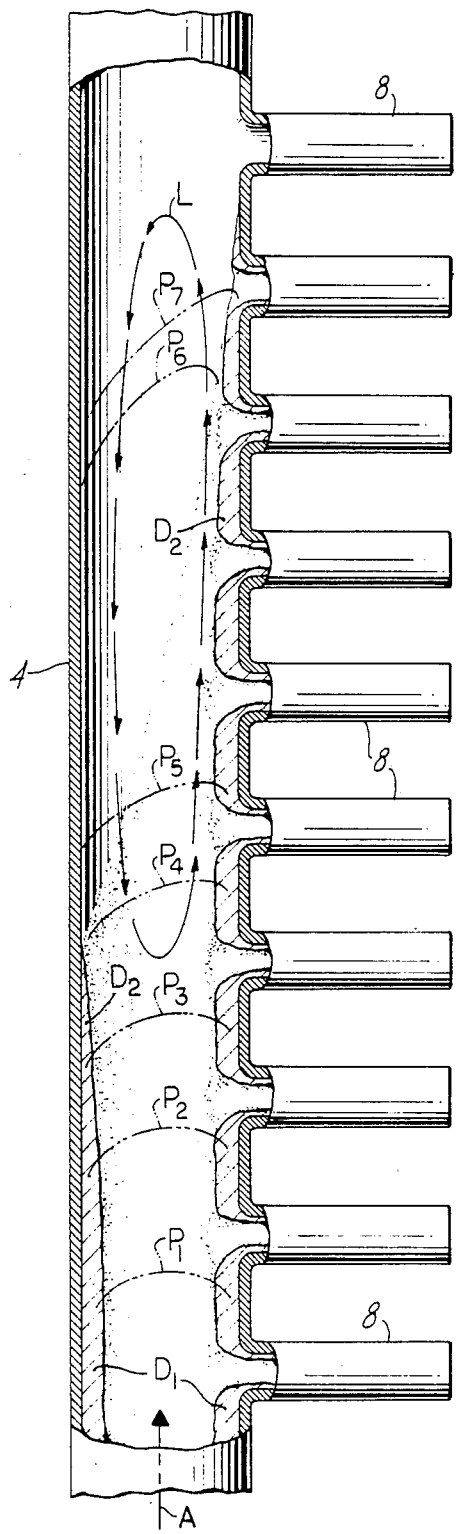
FIG. 2 is a fragmented sectional view of the lower portion of the coolant inlet manifold of the prior art system of FIG. 1.

Referring to FIG. 2, there is shown a representation of the inside of the inlet manifold 4 which is fed from the bottom as per the prior art, and the water flow patterns in the manifold 4, as well as the manner in which particulate material is suspended and deposited in the manifold 4. As the water enters the manifold 4 from the bottom per arrow A, the water flow rate exhibits a symmetrical linear velocity profile $P_1$ (shown in phantom), and the material deposited on the wall of the manifold 4 is deposited symmetrically in the lower entry area of the manifold 4, as indicated at $D_1$, and is also deposited in the bottom snivvies. Inlet turbulence caused by the right angle inlet elbow may contribute to a recirculation pattern in this area. As the inflowing water rises through the manifold 4, its flow pattern becomes asymmetrical due to the outflow into the snivvies 8 and decreases in linear velocity. The water flows upward at a faster velocity on the snivvy side of the manifold, as shown by profiles $P_2$ through $P_7$. This asymmetrical flow profile causes particulate matter suspended in the water to be swirled in a counterclockwise loop L. Swirling of the suspended particles in turn causes asymmetrical deposits of material on the inner portions of the manifold wall with little or no deposition occurring on the wall away from the snivvies, and with accentuated deposition occurring on the snivvy side of the manifold as per $D_2$. Material that would otherwise settle toward the bottom of the manifold is constantly swirled back up through the manifold 4 along the snivvy wall and into the snivvies 8.

Additionally, some agglomeration of swirling particles is believed to occur which results in creating larger particles which can settle toward bottom snivvies, enter them and cause blockage. Bottom snivvies may also receive blockage particles from manifold inlet turbulence due to the right angle elbow. The overall linear velocity in the manifold decreases after each snivvy by the amount of flow through the snivvy, whereby average linear velocity in manifold decreases, and flow profile becomes more asymmetrical, as the coolant flows up the manifold.

As shown in FIG. 3, the increased concentration of deposited material and suspended material will cause flow problems in the lower snivvies. The snivvies 8', 8" and 8''' shown in FIG. 3, are depicted as they are situated in the manifold 4 with 8' being the lowest and 8''' being the highest. It will be appreciated that more suspended material will be swept into the lower snivvies 8' and 8" than will be swept into the upper snivvy 8'''. As shown in the snivvy 8', particulateladen water is drawn into and flows per arrows B through the snivvy due to its low position in the manifold. This results in increased corrosion deposits being formed on the internal wall of the snivvy 8' which will block the snivvy and close it to further water flow. The snivvy 8" is located higher up on the manifold 4 but still in the particle swirl area. The flow direction of water is again shown by arrows B. The snivvy 8" has had its entrance plugged by a larger particle of suspended material which was swept into the snivvy by the swirling water. This also effectively blocks the snivvy 8" against further passage of water. The snivvy 8''' is higher still on the manifold 4, above the majority of the particle swirl. At this height, the lower overall linear velocity acts to reduce the concentration of particles which can reach this snivvy. Water flows through the snivvy 8''' in the direction of the arrows B. It will be noted that corrosion deposits will occur on the internal wall of the snivvy 8''', but they will not be as heavy as the deposits in the snivvy 8', nor is there a likelihood that suspended particles will be swept up to the snivvy 8''' to present a blockage problem, as will be present in the lower snivvies, such as 8". It will be appreciated that increased corrosion deposits in the lower snivvies will require more frequent cleaning of the entire system to ensure proper cooling of the stack 2. For example, the entire system will have to be cleaned even though half of the snivvies may be perfectly functional. Additionally, the lodging of larger particles in the bores of the lower snivvies creates low snivvy flow conditions which can cause cell stack sections involved to be hotter than desired. This unpredictable situation is difficult to diagnose.

It will be appreciated that the snivvy bores can be constant in diameter, as shown in FIG. 3, or can include pressure control constrictions, either at their inlets or further into the bore.

Figure 4:
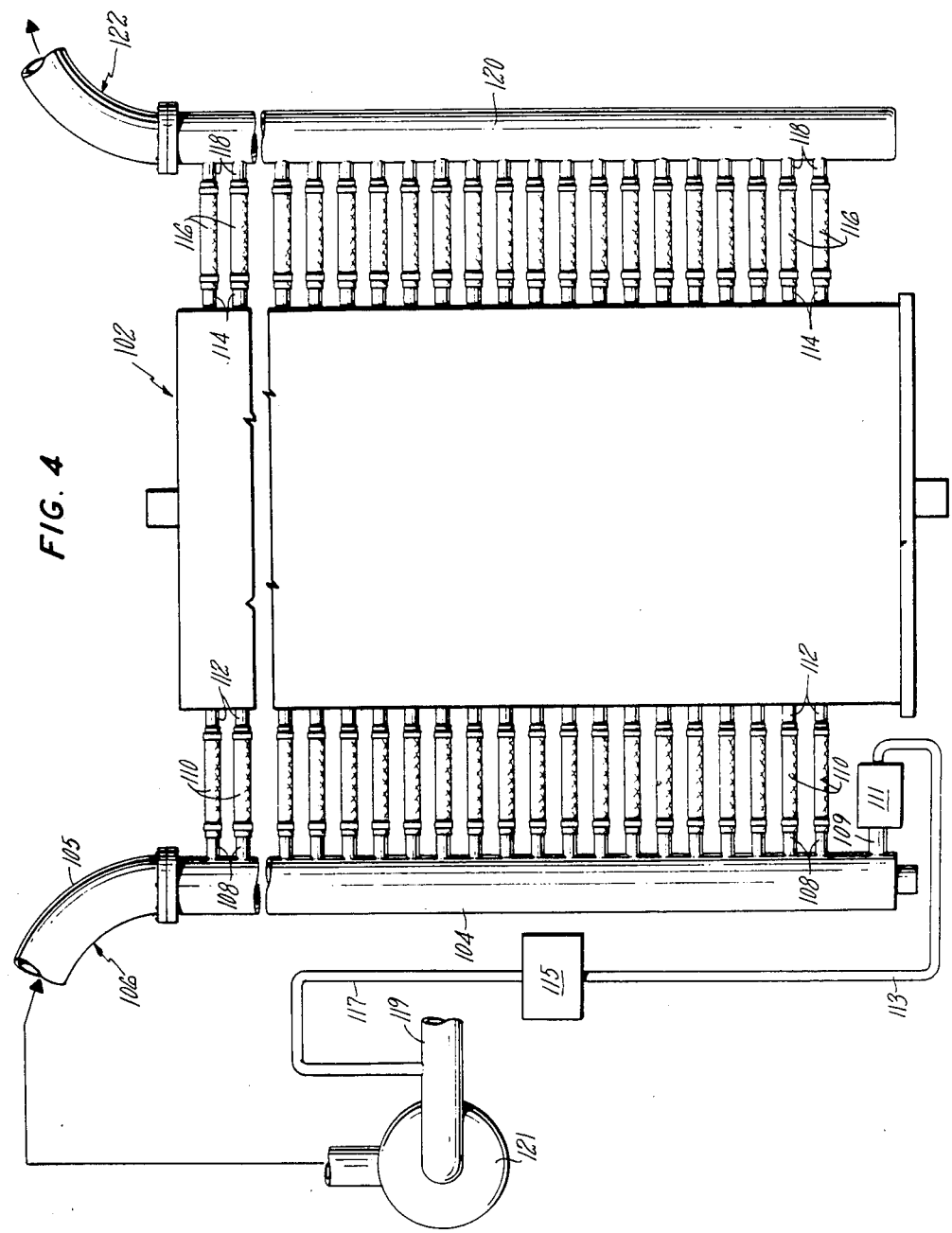
FIG. 4 is a schematic elevational view of a stack cooling system formed in accordance with this invention.

Referring now to FIG. 4, the cell stack cooling system of this invention is shown. The system of FIG. 4 avoids the premature and uneven clogging of the snivvies as follows. The cell stack is denoted generally by the numeral 102 and coolant water is fed into the stack cooling plates from the inlet manifold 104. The water is fed into the inlet manifold 104 through the inlet conduit 106 which opens into the top of the inlet manifold 104. The inlet conduit leads into the manifold 104 through a large radius elbow 105, the radius of which is about three to four pipe diameters. The use of the larger than prior art radius entry reduces inlet turbulence in the top of the manifold 104. The inlet manifold has the inlet snivvies 108 connected to dielectric hoses 110 which in turn are connected to the coolant plate feeders 112. At the bottom of the inlet manifold 104 there is a terminal bleed snivvy 109 connected to a sleeve 111 which in turn is connected to a bleed conduit 113. On the cooling outlet side of the stack 102, there are the cooling plate outlet pipes 114 connected to the dielectric hoses 116 which in turn are connected to snivvies 118 on the outlet manifold 120. The outlet conduit 122 is connected to the outlet manifold 120 at the top of the latter. The bleed conduit 113 is connected to a polisher 115, which contains an ion exchange bed and which is connected in turn to a coolant line 117 leading to the coolant recirculating line 119 which delivers water from the steam separator to the coolant circulating pump 121. The low flow in the bleed line 113 allows the coolant to cool to the lower temperatures required for the ion exchange polisher 115. The pump 121 then recirculates the coolant water back to the inlet conduit 106. Since the water coolant enters the inlet manifold 104 from the top, there is substantially no upward flow of water in the lower portion of the manifold 104. Thus, there is no upward swirling of suspended particles in the manifold 104. The corrosion product particles that have a tendancy to settle will migrate to the lower portion of the manifold 104 and will tend to pass through the bleed snivvy 109, through the conduit 113 and polisher 115 and thence back to the inlet manifold 104 at the top thereof. These particles will thus tend to be removed in the polisher, and the cleaned water will be fed back into the coolant recirculation line 119 to be recirculated back through the system. With the system of FIG. 4, there will be no excessive localization of suspended particles, and no repetitious swirling of the concentration of particles over any particular portion of the manifold 104. The result is that corrosion product deposition tends to occur relatively evenly throughout the manifold and snivvies so that the stack 102 can be operated for longer periods of time between chemical cleanings of the cooling system. As noted, the large radius bend at the top of the inlet manifold will tend to reduce turbulence and possible agglomeration of corrosion product particles.

Figure 5:
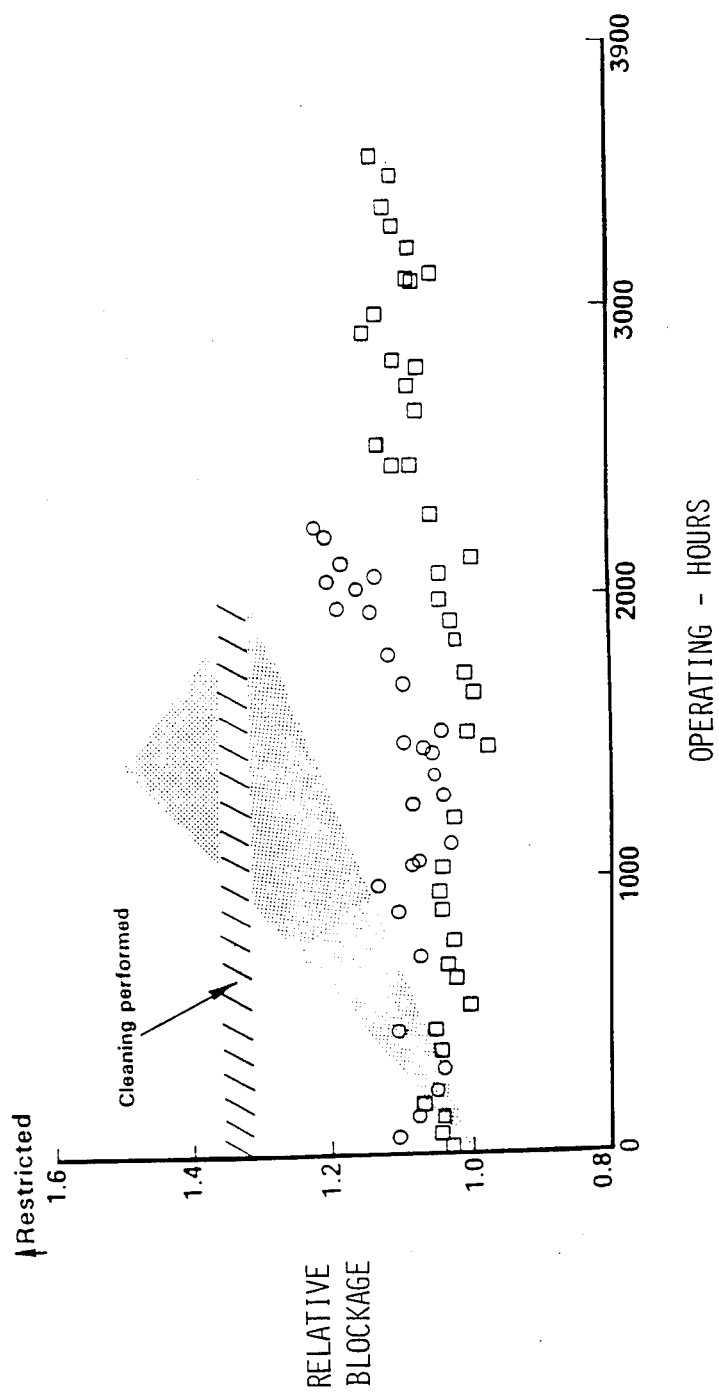
FIG. 5 is a graphic representation of the improved coolant circulation achieved with the system of this invention as compared to the system of the prior art.

Referring now to FIG. 5, there is shown a graphic comparison of the operating efficiency of the prior art system of FIGS. 1 through 3 as compared to the system of this invention shown in FIG. 4. The X axis denotes operating hours of a stack and the Y axis denotes relative blockage of the snivvies in a stack inlet manifold.

Relative blockage is determined by dividing the constant 0.0525 by the equivalent orifice diameter ($D_{eq}$). The equivalent orifice diameter, in turn, is calculated from the formula $$D_{eq} = \left[ (2.8 \times 10^{-7}) \times \frac{w^2}{pn^2 \Delta P} \right]^{\frac{1}{4}}$$

where: W equals flow rate of water in lb/hr; p equals the density of water in lb/ft$^3$; n equals the number of snivvies in the manifold; and $\Delta P$ equals the pressure drop in psi.

In the graph, a relative blockage of one indicates a clear and open passage. Increases in relative blockage indicate narrowing of passages by internal buildup of deposits. The horizontal striped area indicates that cleaning of the passages should be performed at a relative blockage of about 1.35. The stippled or shaded area is representative of performance data taken from about fifteen power plant stacks which manifolded the coolant as per the prior art shown in FIGS. 1 through 3. When using the prior art system, the stacks had to be cleaned after operating in the range of one thousand to two thousand hours. The data represented by the small circular points represents performance data from a stack which manifolded the coolant as shown in FIG. 4. That stack operated for about two thousand two hundred hours without requiring a cleaning of the coolant conduits. The data represented by the small squares indicates performance data from another stack in which the coolant was manifolded as shown in FIG. 4. That stack operated for a total of three thousand six hundred hours without requiring a cleaning of its coolant passages.

It will be readily appreciated that with the change in the coolant inlet manifold which is shown in FIG. 4, the operating life and resultant efficiency of the fuel cell stacks was remarkably prolonged and improved.

It should be understood that the invention is not limited to the particular embodiments shown and described herein, but that various changes and modifications may be made without departing from the spirit and scope of this novel concept as defined by the following claims.

We claim:

1. An electrochemical cell cooling system of the type which uses a water coolant, said system comprising:
    (a) a stack of electrochemical cells to be cooled, said stack including a plurality of cooling plates interspersed therethrough;
    (b) a water coolant inlet manifold disposed on one side of said stack, said inlet manifold having a top end and a bottom end and a plurality of coolant feed snivvies extending from said inlet manifold to said cooling plates for feeding coolant from said inlet manifold to each of said cooling plates;
    (c) a water coolant inlet conduit operably connected to said inlet manifold for admitting coolant water to said inlet manifold via said top end of said inlet manifold;
    (d) a coolant bleed snivvy disposed at said bottom end of said inlet manifold below a lowermost of said feed snivvies, said bleed snivvy being thus positioned to be in a zone of said inlet manifold into which corrosion product particles will settle in said inlet manifold, and said bleed snivvy providing a constantly open passage through which settling corrosion product particles will exit from said inlet manifold;

(e) a bleed conduit operably connected to said bleed snivvy to duct corrosion product particles from said inlet manifold to a polisher wherein said particles will be removed from said water coolant; and (f) means for returning said water coolant to a main stream of said cooling system after treatment in said polisher.

2. The cooling system of claim 1 wherein said means for returning is operably connected to said top end of said inlet manifold to return water coolant thereto.

* * * * *